(12) United States Patent
O'Malley et al.

(10) Patent No.: US 10,615,423 B2
(45) Date of Patent: Apr. 7, 2020

(54) CATALYST

(71) Applicant: Johnson Matthey Fuel Cells Limited, London (GB)

(72) Inventors: Rachel Louise O'Malley, Reading (GB); Enrico Petrucco, Reading (GB); Simon Johnson, London (GB)

(73) Assignee: Johnson Matthey Fuel Cells Limited, London, England ( * ) Notice: Subject to any disclaimer, the term of this patent is extended or adjusted under 35 U.S.C. 154(b) by 0 days.

(21) Appl. No.: 15/509,660

(22) PCT Filed: Sep. 8, 2015

(86) PCT No.: PCT/GB2015/052584
§ 371 (c)(1),
(2) Date: Mar. 8, 2017

(87) PCT Pub. No.: WO2016/038349
PCT Pub. Date: Mar. 17, 2016

(65) Prior Publication Data
US 2017/0244109 A1    Aug. 24, 2017

(30) Foreign Application Priority Data

Sep. 8, 2014   (GB) .................................. 1415846.3

(51) Int. Cl.
*H01M 4/90* (2006.01)
*C25B 11/04* (2006.01)
(Continued)

(52) U.S. Cl.
CPC ......... *H01M 4/9016* (2013.01); *B01J 35/023* (2013.01); *B01J 37/349* (2013.01);
(Continued)

(58) Field of Classification Search
CPC ............. H01M 4/9016; H01M 4/8652; H01M 8/1004; H01M 2008/1095; H01M 4/8647;
(Continued)

(56) References Cited

U.S. PATENT DOCUMENTS 6,231,731 B1 *   5/2001   Kondo ................ C25B 11/0484
                                                 204/290.03
2004/0031692 A1 *   2/2004   Hardee ................... C23F 13/12
                                                 205/118
(Continued)

FOREIGN PATENT DOCUMENTS

CN    101632928 A    1/2010
EP    0631337 A2    12/1994
(Continued)

OTHER PUBLICATIONS

Dahl, Paul I., et al. "Flame spray pyrolysis of electrode materials for energy applications." MRS Online Proceedings Library Archive 1747 (2015). (Year: 2015).*

(Continued)

*Primary Examiner* — Milton I Cano
*Assistant Examiner* — Philip A. Stuckey
(74) *Attorney, Agent, or Firm* — BakerHostetler

(57) ABSTRACT

A catalyst comprising particles of iridium oxide and a metal oxide (M oxide), wherein the metal oxide is selected from the group consisting of a Group 4 metal oxide, a Group 5 metal oxide, a Group 7 metal oxide and antimony oxide, wherein the catalyst is prepared by subjecting a precursor mixture to flame spray pyrolysis, wherein the precursor mixture comprises a solvent, an iridium oxide precursor and a metal oxide precursor is disclosed. The catalyst has particular use in catalysing the oxygen evolution reaction.

4 Claims, 2 Drawing Sheets

(51) Int. Cl.
- B01J 37/34 (2006.01)
- C25B 9/10 (2006.01)
- B01J 35/02 (2006.01)
- C25B 1/10 (2006.01)
- C25B 9/08 (2006.01)
- H01M 4/86 (2006.01)
- H01M 8/1004 (2016.01)
- B01J 23/648 (2006.01)
- B01J 23/46 (2006.01)
- B01J 35/10 (2006.01)
- B01J 35/06 (2006.01)
- B01J 23/656 (2006.01)
- B01J 37/02 (2006.01)
- B01J 23/644 (2006.01)
- B01J 21/06 (2006.01)
- B01J 37/08 (2006.01)
- B01J 23/64 (2006.01)
- B01J 31/02 (2006.01)
- B01J 31/04 (2006.01)
- H01M 8/1018 (2016.01)

(52) U.S. Cl.
CPC ............. *C25B 1/10* (2013.01); *C25B 9/08* (2013.01); *C25B 9/10* (2013.01); *C25B 11/0484* (2013.01); *H01M 4/8652* (2013.01); *B01J 21/063* (2013.01); *B01J 23/468* (2013.01); *B01J 23/64* (2013.01); *B01J 23/6445* (2013.01); *B01J 23/6484* (2013.01); *B01J 23/6486* (2013.01); *B01J 23/6562* (2013.01); *B01J 31/0212* (2013.01); *B01J 31/04* (2013.01); *B01J 35/065* (2013.01); *B01J 35/1014* (2013.01); *B01J 37/0215* (2013.01); *B01J 37/0217* (2013.01); *B01J 37/082* (2013.01); *B01J 37/086* (2013.01); *H01M 4/8647* (2013.01); *H01M 8/1004* (2013.01); *H01M 2008/1095* (2013.01); *Y02E 60/366* (2013.01)

(58) Field of Classification Search
CPC .. B01J 23/6484; B01J 35/1014; B01J 35/065; B01J 23/6562; B01J 23/6486; B01J 37/0215; B01J 23/6445; B01J 37/0217; B01J 21/063; B01J 37/086; B01J 37/349; B01J 23/64; B01J 37/082; B01J 23/468; Y02E 60/366
See application file for complete search history.

(56) References Cited

U.S. PATENT DOCUMENTS

| | | | |
|---|---|---|---|
| 2007/0292744 A1 | 12/2007 | Lopez et al. | |
| 2009/0272646 A1* | 11/2009 | Otogawa | C25B 11/041 204/284 |
| 2013/0330651 A1 | 12/2013 | Thompsett et al. | |
| 2014/0001407 A1 | 1/2014 | Milanov et al. | |
| 2014/0045678 A1* | 2/2014 | Kumta | B01J 27/135 502/1 |

FOREIGN PATENT DOCUMENTS

| | | |
|---|---|---|
| EP | 0731520 A1 | 9/1996 |
| EP | 1190768 A1 | 3/2002 |
| EP | 2608297 A1 | 6/2013 |
| JP | 2014504433 A | 2/2014 |
| JP | 2014510993 A | 5/2014 |
| WO | 0024074 | 4/2000 |
| WO | 2011021034 A1 | 2/2011 |
| WO | 2012080726 A1 | 6/2012 |
| WO | 2012107738 A1 | 8/2012 |
| WO | 2014020349 A1 | 2/2014 |

OTHER PUBLICATIONS

Wittmaier, D., et al., "Screening and further investigations on promising bi-functional catalysts for metal-air batteries with an aqueous alkaline electrolyte," J Appl Electrochem (2014) 44:73-85.

\* cited by examiner

CATALYST

FIELD OF THE INVENTION

The present invention relates to a novel oxygen evolution reaction catalyst and its use in electrochemical applications, in particular in a proton exchange membrane fuel cell. The invention further relates to a method for the production of such novel oxygen evolution reaction catalysts.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell (PEMFC) the membrane is proton conducting, and protons, produced at the anode, are transported across the membrane to the cathode, where they combine with oxygen to form water.

A principal component of the PEMFC is the membrane electrode assembly (MEA), which is essentially composed of five layers. The central layer is the polymer ion-conducting membrane. On either side of the ion-conducting membrane there is an electrocatalyst layer, containing an electrocatalyst designed for the specific electrolytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

Electrocatalysts for fuel oxidation and oxygen reduction are typically based on platinum or platinum alloyed with one or more other metals. The platinum or platinum alloy catalyst can be in the form of unsupported nanoparticles (such as metal blacks or other unsupported particulate metal powders) or can be deposited as even higher surface area particles onto a conductive carbon substrate or other conductive material (a supported catalyst).

Conventionally, the MEA can be constructed by a number of methods outlined hereinafter:

(i) The electrocatalyst layer may be applied to the gas diffusion layer to form a gas diffusion electrode. A gas diffusion electrode is placed on each side of an ion-conducting membrane and laminated together to form the five-layer MEA;

(ii) The electrocatalyst layer may be applied to both faces of the ion-conducting membrane to form a catalyst coated ion-conducting membrane. Subsequently, a gas diffusion layer is applied to each face of the catalyst coated ion-conducting membrane.

(iii) An MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically tens or hundreds of MEAs are required to provide enough power for most applications, so multiple MEAs are assembled to make up a fuel cell stack. Flow field plates are used to separate the MEAs. The plates perform several functions: supplying the reactants to the MEAs; removing products; providing electrical connections; and providing physical support.

In normal fuel cell operation where the cathode is promoting the oxygen reduction reaction and the anode is promoting the hydrogen oxidation reaction, the electrode potentials are typically 0.9-0.6 V and 0.0-0.1 V vs a standard hydrogen electrode, such as a reversible hydrogen electrode (RHE), respectively. However, in a number of real-life operational situations other reactions may be promoted intermittently at either the anode or cathode, and these can occur at undesirably high electrochemical potentials of above 1.0 V, or even above 2.0 V, at either the anode or cathode. These elevated potentials can cause irreversible damage to the electrocatalyst layer/electrode structure, due to corrosion of any carbon present in the layer (such as the support material for the catalyst) and loss of active surface area of the nanoparticulate electrocatalyst metal due to various metal sintering degradation mechanism that occur during high potential excursions. Such operational situations are well documented, but include:

(i) Cell reversal: fuel cells occasionally are subjected to a voltage reversal (cell is forced to the opposite polarity) often caused by a temporary depletion of fuel supply to the anode. This then leads to temporary undesirable electrochemical reactions taking place in order to maintain the generation of the electrical current, such as carbon electro-oxidation at the anode which occurs at a higher potential than the oxygen reduction reaction at the cathode. In such a cell reversal situation (even for very short durations), the anode structure can be irreversibly damaged, due to oxidation of the carbon thus leading to loss of the electrocatalyst support.

(ii) Start-up/shut-down: when a fuel cell has been idle for some time it is quite possible for oxygen from the air to diffuse through the membrane from the cathode side and to displace any residual hydrogen still present in the anode side. When the cell is re-started and hydrogen is re-introduced into the anode, a mixed hydrogen/air composition will exist in the anode for a short period as a front that moves through the cell until the air is purged completely from the anode. The presence of a front that is hydrogen-rich on the inlet side and air-rich on the outlet side can set up an internal electrochemical cell within the fuel cell, such that carbon electro-oxidation is forced to occur at elevated potentials on the cathode side as the counter-reaction to oxygen reduction occurring at the outlet side of the anode. In such a start-up situation, the cathode structure can be irreversibly damaged, due to oxidation of the carbon and thus permanent degradation of the cathode catalyst layer structure can occur. A similar damaging electrochemical cell may also be set up on shut-down. Although it may be possible to limit these processes from occurring by employing system mitigation strategies, for example purging of the anode gas space with an inert gas such as nitrogen during shut-down, an MEA solution alleviates the need for these system complexities.

Solutions proposed to address the problems associated with incidences of high electrochemical potentials include employing an electrocatalyst support that is more resistant to oxidative corrosion than conventional electrocatalyst supports or incorporating an additional electrocatalyst composition that has activity for an alternative oxidation reaction that could take place at the high electrochemical potentials in preference to the damaging carbon electro-oxidation reactions, such as the oxygen evolution reaction (electrolysis of water).

SUMMARY OF THE INVENTION

WO2011/021034 discloses a catalyst for the oxygen evolution reaction (water electrolysis) comprising iridium or iridium oxide and one or more metals M or an oxide thereof, wherein M is selected from the group consisting of transition metals and Sn, with the exception of ruthenium. These catalysts are made by conventional methods.

It is an object of the present invention to provide catalysts for the oxygen evolution reaction which have improved performance for the oxygen evolution reaction over those disclosed in WO2011/021034.

The invention provides a catalyst comprising particles of iridium oxide and a metal oxide, said catalyst obtainable by subjecting a precursor mixture to flame spray pyrolysis, wherein the precursor mixture comprises a solvent, an iridium oxide precursor and a metal oxide precursor.

The invention further provides a method for the preparation of a catalyst comprising particles of iridium oxide and a metal oxide, said method comprising subjecting a precursor mixture to flame spray pyrolysis, wherein the precursor mixture comprises a solvent, an iridium oxide precursor and a metal oxide precursor.

The invention further provides a catalyst, and in particular a catalyst for facilitating an oxygen evolution reaction, comprising particles of iridium oxide and a metal oxide, characterised in that the surface area (BET) of the catalyst is ≥50 m$^2$/g and the particles of iridium oxide and the metal oxide have a d90≤15 nm.

The invention further provides the use of a catalyst for facilitating the oxygen evolution reaction.

DETAILED DESCRIPTION OF THE INVENTION

Figure 1:
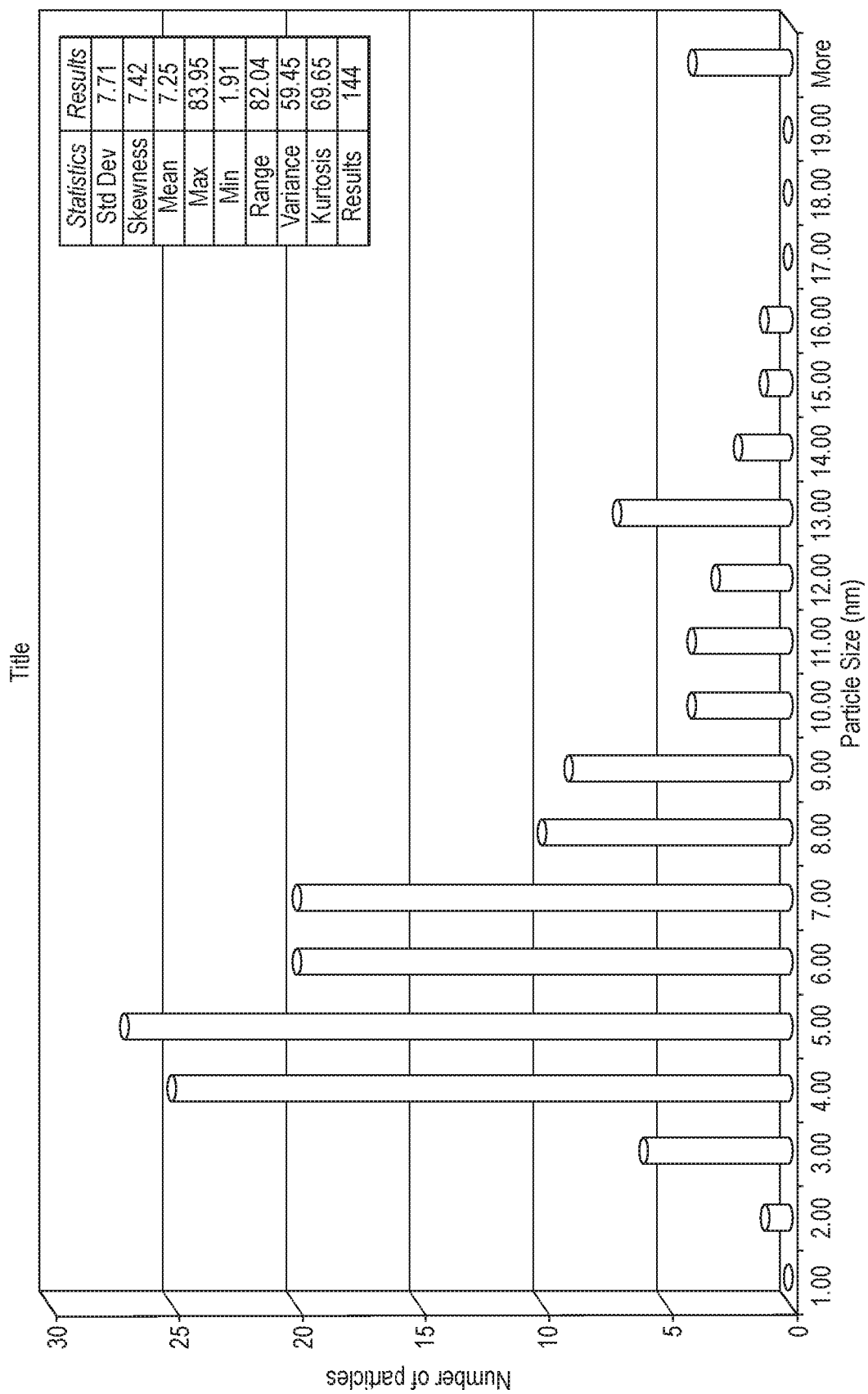
FIG. 1 is a chart showing the particle size distribution for Example 1.

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

The invention provides a catalyst comprising particles of iridium oxide and a metal oxide, wherein the catalyst is prepared by subjecting a precursor mixture to flame spray pyrolysis, wherein the precursor mixture comprises a solvent, an iridium oxide precursor and a metal oxide precursor.

Suitably, the iridium oxide is of formula $IrO_2$.

The metal oxide may be a Group 4 metal oxide (e.g. titanium oxide).

The metal oxide may be a Group 5 metal oxide (e.g. tantalum oxide or niobium oxide).

The metal oxide may be a Group 7 metal oxide (e.g. manganese oxide).

The metal oxide may be antimony oxide.

Suitably, the metal oxide is selected from the group consisting of tantalum oxide, titanium oxide, antimony oxide, manganese oxide and niobium oxide; more suitably, tantalum oxide, antimony oxide, manganese oxide and niobium oxide; more suitably tantalum oxide.

The atomic ratio of iridium to metal M in the metal oxide is from 80:20 to 40:60, suitably 75:25 to 50:50.

The iridium oxide and metal oxide suitably exist as particles, each particle comprising both the iridium oxide and the metal oxide; there may be some alloying of the materials, the extent of any alloying being shown by x-ray diffraction. However, there may be some particles comprising only one of the iridium oxide and metal oxide.

The catalysts of the invention are preferably unsupported, but may optionally be supported on a further metal oxide particle.

The catalysts of the invention are prepared using a flame spray pyrolysis technique. Such techniques are known in the art and involve providing a solution of an iridium oxide precursor and a metal oxide precursor in a suitable solvent and delivering the solution into a flame at a suitable rate.

Suitably, the oxygen dispersion rate is from 5 to 100 l/min; more suitably from 10 to 70 l/min; and preferably from 20 to 40 l/min.

Suitably, the precursor feed rate is from 2.5 to 80 ml/min; more suitably from 2.5 to 50 ml/min; and preferably from 5 to 10 ml/min.

Suitable iridium oxide precursors include iridium organometallic compounds, such as iridium ethyl hexanoate, iridium acetyl acetonate and iridium acetate.

Suitable metal oxide precursors include organometallic compounds, such as metal ethoxide, metal ethyl hexanoate and metal acetate.

The solvent is required to have a high enthalpy of combustion. Suitable solvents include toluene, xylene, benzyl alcohol, acetic acid/benzyl alcohol blends, ethanol, methanol, acetonitrile, ethyl hexanoic acid. The precursor materials are required to be soluble in the solvent and selection of an appropriate solvent for the given precursors is within the capability of the skilled person.

The catalyst, after being formed using the flame spray pyrolysis process, may optionally be subjected to an annealing step, in which the catalyst is heated, suitably to between 400° C. and 700° C., preferably 400° C. to 600° C. The additional heating step is suitably carried out in air. Without being bound by theory, the inventors believe that such a heat treatment step stabilises the catalyst and prevents dissolution of the iridium oxide from the catalyst during use. It is further believed that such a heat treatment step removes catalyst contaminants, for example any carbon residue occurring from the incomplete combustion of the carrier solvent and/or removal of halide species present at trace levels in the precursor materials or the solvent.

A further aspect of the invention provides a method for the preparation of a catalyst comprising particles of iridium oxide and a metal oxide, said method comprising subjecting a precursor mixture to flame spray pyrolysis, wherein the precursor mixture comprises a solvent, an iridium oxide precursor and a metal oxide precursor. The method further comprises the optional heat treatment step described hereinbefore.

The particles of iridium oxide and the metal oxide suitably have a d90 of ≤15 nm, suitably ≤13 nm and preferably ≤12 nm. The particles of iridium oxide and the metal oxide suitably have a d50 of ≤10 nm, suitably ≤8 nm and preferably ≤6 nm. By d90 is meant 90% of the particles have a size less than or equal to the stated dimension.

The particles of iridium oxide and the metal oxide have a mean average particle size suitably from 1 to 15 nm, more suitably from 1 to 10 nm and preferably from 2 to 8 nm. Particles of larger size may be seen, but these are anomalies and are less active.

The particle size distribution can be determined using transmission electron microscopy as is known to those skilled in the art (see for example "Measuring the Size of Nanoparticles Using Transmission Electron Microscopy (TEM)" NIST—NCL Joint Assay Protocol, PCC-7). The calibrated transmission electron microscope is used with appropriate off-the-shelf software to provide the particle size distribution.

The surface area (BET) of the catalyst of the invention is greater than the surface area of the analogous catalyst made by a conventional spray dried method. The surface area of the catalyst of the invention is suitably ≥50 m²/g, suitably ≥60 m²/g; suitably ≥75 m²/g; suitably ≥80 m²/g; suitably ≥85 m²/g; and suitably ≥90 m²/g. The surface area is determined using the BET method known to those skilled in the art; more details can be found in 'Analytical Methods in Fine Particle Technology', by Paul A. Webb and Clyde Orr, Micromeritics Instruments Corporation 1997.

The invention further provides a catalyst comprising particles of iridium oxide and a metal oxide, characterised in that the surface area of the catalyst is ≥50 m²/g and the particles of iridium oxide and the metal oxide have a d90≤15 nm.

The catalysts of the invention have particular utility in catalysing the oxygen evolution reaction:

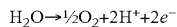

Thus there is further provided a catalyst of the invention for use in catalysing the oxygen evolution reaction. Alternatively, there is provided the use of a catalyst of the invention for catalysing the oxygen evolution reaction and in particular the use of the catalyst of the invention in a fuel cell in which an electrode is subjected to a high electrochemical potential.

The catalysts of the invention have particular use in a catalyst layer, for example for use in a gas diffusion electrode of an electrochemical cell, such as a fuel cell, in particular a PEMFC, or in a catalyst coated ion-conducting membrane of a PEMFC. Thus, there is further provided a catalyst layer comprising the catalyst of the invention and an electrocatalyst; the electrocatalyst facilitates a hydrogen oxidation reaction or an oxygen reduction reaction. The catalyst of the invention and the electrocatalyst may be present in the catalyst layer either as separate layers or as a mixed layer or as a combination of the two. If present as separate layer, the layers are suitably arranged such that the layer comprising the catalyst of the invention is present where most water is present in a functioning MEA, which is highly dependent on the fuel cell operating conditions and the overall MEA formulation.

The electrocatalyst preferably comprises platinum.

The platinum may be alloyed or mixed with one or more other platinum group metals (ruthenium, rhodium, palladium, osmium or iridium), gold, silver or a base metal or an oxide of one or more other platinum group metals, gold, silver or a base metal.

If the catalyst layer is an anode catalyst layer, the platinum may be alloyed with one or more of osmium, ruthenium, niobium, tantalum, vanadium, iridium, tin, titanium or rhodium; or an oxide thereof.

If the catalyst layer is a cathode catalyst layer, the platinum may be alloyed with one or more of nickel, cobalt, chromium, palladium, iridium, copper, iron or zinc; or an oxide thereof.

The electrocatalyst may be unsupported.

Alternatively, the electrocatalyst may be supported on a carbon support material. The carbon support material may be a particulate or fibrous material, such as one or more carbonaceous materials selected from the group consisting of graphite, nanofibres, nanotubes, nanographene platelets, low surface area carbon blacks (such as acetylene black), heat-treated or graphitised (above 2000° C.) carbon blacks or other highly graphitic carbon supports.

Alternatively, the electrocatalyst is supported on a non-carbonaceous support. Examples of such a support include titania, niobia, tantala, tungsten carbide, hafnium oxide or tungsten oxides. Such oxides and carbides may also be doped with other metals to increase their electrical conductivity, for example niobium doped titania.

Alternatively, the electrocatalyst may be supported on the catalyst of the invention, i.e. the catalyst comprising iridium oxide and a metal oxide.

Alternatively, a mixture of unsupported and supported electrocatalyst may be used, wherein the support for the supported electrocatalyst may be carbon, a non-carbonaceous support, the catalyst of the invention or a mixture thereof.

The electrocatalyst may be made by methods known to those in the art, for example by wet chemical methods.

The catalyst layer may comprise additional components. Such components include, but are not limited to: an ion-conducting polymer, such as a proton conducting polymer, included to improve the ionic conductivity within the layer; a hydrogen peroxide decomposition catalyst; a hydrophobic additive (e.g. a polymer such as polytetrafluoroethylene (PTFE) or an inorganic solid with or without surface treatment) or a hydrophilic additive (e.g. a polymer of an inorganic solid, such as an oxide) to control water transport.

To prepare the catalyst layer, the catalyst of the invention, the electrocatalyst and any additional components are dispersed in an aqueous and/or organic solvent to prepare a catalyst ink. If required, particle break-up is carried out by methods known in the art, such as high shear mixing, milling, ball milling, passing through a microfluidiser etc. or a combination thereof, to achieve uniformity of particle size.

After preparation of the catalyst ink, the ink is deposited onto a substrate (e.g. gas diffusion layer, ion-conducting membrane or a carrier/transfer substrate) to form the catalyst layer. The ink may be deposited by any suitable technique known to those in the art, including but not limited to gravure coating, slot die (slot, extrusion) coating, screen printing, rotary screen printing, inkjet printing, spraying, painting, bar coating, pad coating, gap coating techniques such as knife or doctor blade over roll, and metering rod application.

Alternatively, an ink comprising the catalyst of the invention and a second ink comprising the electrocatalyst are prepared and the two inks deposited sequentially onto a substrate to provide a catalyst layer having two discrete layers—one layer containing the catalyst of the invention and the second layer containing the electrocatalyst. Alternatively, one ink is deposited onto a first substrate (e.g. a gas diffusion substrate) to form a layer comprising the first ink; the second ink is deposited onto a second substrate (e.g. an ion-conducting membrane) to form a layer comprising the second ink; the layer comprising the first ink and the layer comprising the second ink are then brought into contact to form a catalyst layer of the invention.

The characteristics of the catalyst layer, such as the thickness, electrocatalyst loading, porosity, pore size distribution, average pore size and hydrophobicity will depend on whether it is being used at the anode or cathode.

If for use at the anode, the catalyst layer thickness is suitably ≥1 µm; more suitably ≥2 µm; preferably ≥5 µm. The catalyst layer is suitably ≤15 µm; more suitably ≤10 µm.

If for use at the cathode, the catalyst layer is suitably ≥2 µm; preferably ≥5 µm. The catalyst layer is suitably ≤20 µm; more suitably ≤15 µm.

The loading of platinum from the electrocatalyst in the catalyst layer will depend on whether it is being used at the anode or cathode.

If for use at the anode, the loading of the platinum in the catalyst layer is from 0.02 to 0.2 mgPt/cm$^2$, suitably from 0.02 to 0.15 mgPt/cm$^2$ and preferably from 0.02 to 0.1 mgPt/cm$^2$.

If for use at the cathode, the loading of the platinum in the catalyst layer is from 0.05 mgPt/cm$^2$ to 0.4 mgPt/cm$^2$.

In the catalyst layer, the weight ratio of iridium in the catalyst of the invention to platinum in the electrocatalyst is from 0.01:1 to 10:1. The actual ratio will depend on whether the catalyst layer is used at the anode or cathode. In the case of an anode catalyst layer, the ratio is suitably from 0.05:1 to 10:1, preferably, from 0.25:1 to 5:1. In the case of a cathode catalyst layer, the ratio is suitably from 0.1:1 to 1:1, preferably from 0.1:1 to 0.5:1.

The catalyst layer may be deposited onto a gas diffusion layer to form a gas diffusion electrode. Thus, a further aspect of the invention provides a gas diffusion electrode comprising a gas diffusion layer and a catalyst layer of the invention. The gas diffusion layers are suitably based on conventional gas diffusion substrates. Typical substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc.), or woven carbon cloths. The carbon paper, web or cloth may be provided with a pre-treatment prior to fabrication of the electrode and being incorporated into a MEA either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. For applications such as the PEMFC, a microporous layer may also be applied to the gas diffusion substrate on the face that will contact the electrocatalyst layer. The microporous layer typically comprises a mixture of a carbon black and a polymer such as polytetrafluoroethylene (PTFE).

Alternatively, the catalyst layer is deposited onto an ion-conducting membrane, by direct coating of a catalyst ink onto the membrane, to form a catalysed membrane. Thus, a further aspect of the invention provides a catalysed membrane comprising an ion-conducting membrane and a catalyst layer of the invention. The ion-conducting membrane may be any membrane suitable for use in a PEMFC, for example the membrane may be based on a perfluorinated sulphonic acid material such as Nafion® (DuPont), Aquivion® (Solvay Specialty Polymers), Flemion® (Asahi Glass) and Aciplex® (Asahi Kasei). Alternatively, the membrane may be based on a sulphonated hydrocarbon membrane such as those available from FuMA-Tech GmbH as the Fumapem® P, E or K series of products, JSR Corporation, Toyobo Corporation, and others. Alternatively, the membrane may be based on polybenzimidazole doped with phosphoric acid which will operate in the range 120° C. to 180° C.

The ion-conducting membrane component may comprise one or more materials that confer mechanical strength to the ion-conducting membrane component. For example, the ion-conducting membrane component may contain a porous reinforcing material, such as an expanded PTFE material or a nanofibre network.

The ion-conducting membrane may comprise one or more hydrogen peroxide decomposition catalysts either as a layer on one or both faces of the membrane or embedded within the membrane. Examples of the hydrogen peroxide decomposition catalyst suitable for use are known to those skilled in the art and include metal oxides, such as cerium oxides, manganese oxides, titanium oxides, beryllium oxides, bismuth oxides, tantalum oxides, niobium oxides, hafnium oxides, vanadium oxides and lanthanum oxides; suitably cerium oxides, manganese oxides or titanium oxides; preferably cerium dioxide (ceria).

The ion-conducting membrane component may optionally comprise a recombination catalyst, in particular a catalyst for the recombination of unreacted H$_2$ and O$_2$, that can diffuse into the membrane from the anode and cathode respectively, to produce water. Suitable recombination catalysts comprise a metal (such as platinum) on a high surface area oxide support material (such as silica, titania, zirconia). More examples of recombination catalysts are disclosed in EP0631337 and WO00/24074.

Alternatively, the catalyst layer is deposited onto a transfer substrate by coating of a catalyst ink onto the transfer substrate, to form a catalysed transfer substrate. Thus an alternative aspect of the invention provides a catalysed transfer substrate comprising a transfer substrate and a catalyst layer of the invention. The transfer substrate is intended to be removed from the layer in a subsequent step. For example, the catalyst layer may be transferred, by decal transfer, to a gas diffusion layer or ion-conducting membrane, the transfer substrate being removed immediately after, or at some point subsequent to, the transfer process.

Alternatively, the catalyst layer is deposited onto a carrier film by coating a catalyst ink onto the carrier film to form a catalysed carrier film. Thus an alternative aspect of the invention provides a catalysed carrier film comprising a carrier film and a catalyst layer of the invention. Additional layers may be deposited on the exposed face of the catalyst layer prior to removal of the carrier film; for example an ion-conducting ionomer layer may be applied from a dispersion of ionomer using any suitable deposition technique known as described above in relation to deposition of the catalyst layer. Further additional layers can be added as required, for example as described in International Patent Application No. PCT/GB2015/050864. The carrier film is removed from the catalyst layer at an appropriate time.

The carrier film and/or transfer substrate may be formed from any suitable material from which the catalyst layer can be removed without damage thereto. Examples of suitable materials include a fluoropolymer, such as polytetrafluoroethylene (PTFE), ethylene tetrafluoroethylene (ETFE), perfluoroalkoxy polymer (PFA), fluorinated ethylene propylene (FEP—a copolymer of hexafluoropropylene and tetrafluoroethylene) and polyolefins, such as biaxially oriented polypropylene (BOPP).

The invention further provides a MEA comprising a catalyst layer, a gas diffusion electrode or a catalysed membrane of the invention and an electrochemical device, such as a fuel cell, comprising a MEA, catalyst layer, gas diffusion electrode or catalysed membrane of the invention.

Although the invention is described with reference to its use in a PEMFC, it can be understood that the catalyst layer of the invention will have application in other types of fuel cells where the high voltage situations as described can occur. In addition the catalyst of the invention may find application in other electrochemical devices, and in particular in water electrolysis cells where the oxygen evolution reaction is the primary reaction at the anode. In addition, the catalyst of the invention may find application in non-electrochemical devices.

The invention will be further described with reference to the following examples which are illustrative and not limiting of the invention.

General Method for Preparation of the Examples by Flame Spray Pyrolysis

Examples 1 to 7 of the invention were prepared using a laboratory scale flame spray pyrolysis setup. The precursor material for the iridium oxide and the metal oxide (given in Table 1 below) were mixed according to the product composition and dissolved in the solvent (toluene). The total final metal concentration in the precursor mixture was kept constant at 0.15 mol/l throughout. The as-prepared solutions were stable and were delivered into the flame of the flame spray pyrolysis apparatus by a peristaltic pump at the feed rate indicated in Table 1. The flame consists of a central spray delivery, a premixed, circular support flame and a circular sheet gas delivery. Oxygen was used as the dispersion gas and delivered at the rate indicated in Table 1. A mixture of methane (1.5 l/min) and oxygen (3.2 l/min) was fed to the inner nozzle and formed a premixed flame. All gas flow rates were controlled by calibrated mass flow controller.

TABLE 1

| | Iridium oxide precursor | Metal oxide precursor | Solvent | Oxygen dispersion gas rate (L/min) | Feed rate (ml/min) |
|---|---|---|---|---|---|
| Example 1: $IrO_2/Ta_2O_5$ | Ir ethyl hexanoate | Tantalum ethoxide | Toluene | 40 | 10 |
| Example 2: $IrO_2/Sb_2O_5$ | Ir ethyl hexanoate | Antimony ethoxide | Toluene | 20 | 5 |
| Example 3: $IrO_2/TiO_2$ | Ir ethyl hexanoate | Titanium ethyl hexanoate | Toluene | 20 | 5 |
| Example 4: $IrO_2/Nb_2O_5$ | Ir ethyl hexanoate | Niobium ethoxide | Toluene | 20 | 5 |
| Example 5: $IrO_2/Ta_2O_5$ | Ir ethyl hexanoate | Tantalum ethoxide | Toluene | 20 | 5 |
| Example 6: $IrO_2/TaO_5$ | Ir acetyl acetonate | Tantalum ethoxide | Toluene | 20 | 5 |
| Example 7: $IrO_2/MnO_2$ | Ir ethyl hexanoate | Mn ethyl hexanoate | Toluene | 5 | 5 |

Comparative Example 1

$IrO_2/Ta_2O_5$ was prepared using a method analogous to that described in WO2011/021034.

Measurement of Surface Area

Measurement of the specific surface area (BET) of each of Examples 1 to 7 and Comparative Example 1 was determined. The results are given in Table 2.

TABLE 2

| | Ir:M atomic ratio | BET ($m^2/g$) |
|---|---|---|
| Example 1 | 70:30 | 93 |
| Example 2 | 66:34 | 96 |
| Example 3 | 50:50 | 99 |
| Example 4 | 64:36 | 91 |
| Example 5 | 72:28 | 55 |
| Example 6 | 59:41 | 90 |
| Example 7 | 67:33 | 39 |
| Comparative Example 1 | 70:30 | 43 |

Measurement of Particle Size

The mean average particle size and d90 of Example 1 was measured using transmission electron microscopy (TEM) using Digital Micrograph software from Gatan to aid the analysis. FIG. 1 shows the particle size distribution analysis for Example 1. The mean average particle size of Examples 2 to 7 was seen to be less than 10 nm from TEM.

Preparation of a MEA

Catalyst layers were prepared by brush coating an ink comprising a catalyst of the invention (Example 1 to 7) or Comparative Example 1 onto a hydrophobic microporous layer on a waterproofed carbon fibre gas diffusion substrate (a gas diffusion layer). The catalyst inks were made according to the techniques described in EP 0 731 520. The loading of the catalyst of the invention in the catalyst layer is provided in Table 3.

Conventional anode (using HiSPEC™ 18600 from Johnson Matthey Fuel Cells Limited) and cathode (using HiSPEC™ 9100 from Johnson Matthey Fuel Cells Limited) electrocatalyst layers were applied to either side of a perfluorinated sulphonic acid membrane using the well-known decal transfer method to produce a catalysed membrane. In all Examples (including Comparative Example 1) the loading on the anode catalyst layer was 0.1 mgPt/$cm^2$ and on the cathode catalyst layer was 0.37 mgPt/$cm^2$.

The catalysed membrane and the gas diffusion electrode comprising the catalyst of the invention were assembled in the fuel cell hardware such that the anode catalyst layer contacted the catalyst layer comprising the catalyst of the invention (prepared above) to provide an anode catalyst layer of the invention. The cathode catalyst layer also contacted a waterproofed carbon fibre gas diffusion substrate coated with a hydrophobic microporous layer of carbon/PTFE to form the complete MEA.

The MEAs were tested in a 6 $cm^2$ active area fuel cell at 80° C., 7.2 psig with fully humidified gas reactants. In the initial electrochemical experiments, the anode electrode was supplied with nitrogen and the cathode electrode was supplied with hydrogen, such that the cathode electrode could act as a pseudo RHE (reversible hydrogen electrode). In order to determine the initial activity of the catalysts of the invention for the oxygen evolution reaction (OER), the anode potential was cycled twice between 0.01 and 1.6V vs RITE at 10 mV/s sweep rate. The oxygen evolution mass activity was then determined at 1.5V. During this time, the anode reactant exhaust was continuously sampled using a Spectra Mass Spectrometer to monitor the $O_2$ and $CO_2$ evolved. The differential electrochemical mass spectrometry (i.e. the ratio of $O_2:CO_2$ at 1.5 V) was used to correct the mass activity for oxygen evolution faradaic efficiency. Results are given in Table 3.

Figure 2:
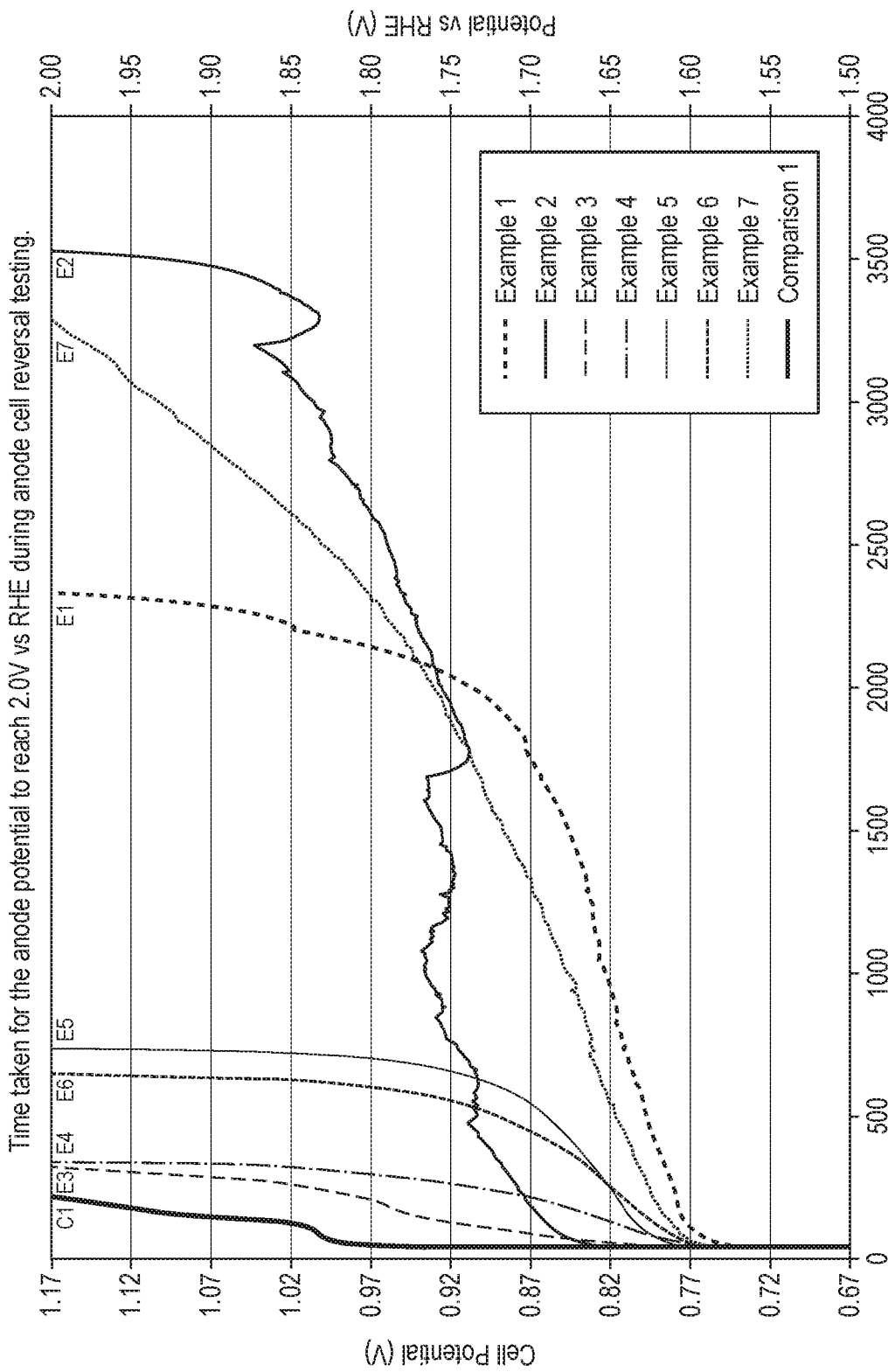
FIG. 2 is a graph showing the time taken for the potential of electrodes containing catalysts of the invention to reach 2.0 V vs RHE (reversible hydrogen electrode).

In order to assess the OER capability of the catalysts under an induced cell reversal event, air was then supplied to the cathode electrode (the supply of nitrogen to the anode was maintained) and a 200 mA/cm² load was drawn. The initial cathode potential at this current density was recorded (approximately 0.83 V) and used to enable the calculation of the anode potential given that the cell potential was monitored ($E_{cell}=E_{cathode}-E_{anode}$ where E=potential). Again, mass spectrometry was used to compare the total amount of $O_2$ and $CO_2$ generated to measure reaction selectivity during the continuous reversal of the layer. The cell potential decayed (increased) with time until a rapid potential increase led to the test being concluded. The time taken for the anode potential to reach 2.0V is given in Table 3 and shown in FIG. 2.

TABLE 3

| | Loading of catalyst of invention in anode of MEA (µgIr/cm²) | Activity | | Durability | |
| --- | --- | --- | --- | --- | --- |
| | | Oxygen evolution mass activity (A/gPGM) | Faradaic efficiency (%) | $O_2/CO_2$ selectivity | Test time at 2.0 V vs RHE (s) |
| Example 1 | 51 | 1829.4 | 98.7 | 67.1 | 2301 |
| Example 2 | 48 | 905.7 | 97.1 | 83.3 | 3498 |
| Example 3 | 40 | 572.1 | 94.4 | 10.1 | 284 |
| Example 4 | 43 | 921.3 | 97.2 | 12.4 | 299 |
| Example 5 | 39 | 823 | 98.2 | 26.2 | 703 |
| Example 6 | 38 | 1294.9 | 98.1 | 23.8 | 614 |
| Example 7 | 56 | 962 | 98.1 | 51.6 | 3186 |
| Comparative Example 1 | 44 | 72.8 | 81.2 | 6.3 | 179 |

It can be seen that MEAs with the catalysts of the invention were more efficient at catalysing the oxygen evolution reaction than MEAs with the catalyst of Comparative Example 1 (as shown by the mass activity and faradaic efficiency) and provided improved protection against degradation of the anode catalyst layer (as demonstrated by the $O_2/CO_2$ selectivity and time taken to reach 2.0 V). The catalysts of the invention were able to continuously evolve oxygen preferentially over carbon corrosion up to an order magnitude more selectively than the catalyst of Comparative Example 1 and the time required before the anode potential reached 2.0 V while at 200 mA/cm² was extended. The catalysts of the invention exhibited a significantly higher activity and a greater MEA durability than Comparative Example 1.

The invention claimed is:

1. A catalyst layer comprising an electrocatalyst and a catalyst comprising particles of iridium oxide and a metal oxide (M oxide), wherein the metal oxide is selected from the group consisting of tantalum oxide, manganese oxide, niobium oxide and antimony oxide, wherein the catalyst is prepared by subjecting a precursor mixture to flame spray pyrolysis, wherein the precursor mixture comprises a solvent, an iridium oxide precursor and a metal oxide precursor;
    wherein the surface area of the catalyst is ≥50 m²/g;
    wherein the particles of iridium oxide and the metal oxide have a d90 of ≤15 nm wherein d90 means 90% of the particles have a size less than or equal to 15 nm; and
    wherein the atomic ratio of iridium to metal in the metal oxide is from 80:20 to 40:60.

2. A catalyzed membrane comprising an ion-conducting membrane and a catalyst layer according to claim 1.

3. A membrane electrode assembly comprising a catalyst layer according to claim 1.

4. An electrochemical device comprising a catalyst membrane according to claim 1.

* * * * *